Aug. 6, 1940.  E. T. PRICE  2,210,499
VEHICLE AXLE SLEEVE
Original Filed Oct. 10, 1934    2 Sheets-Sheet 1
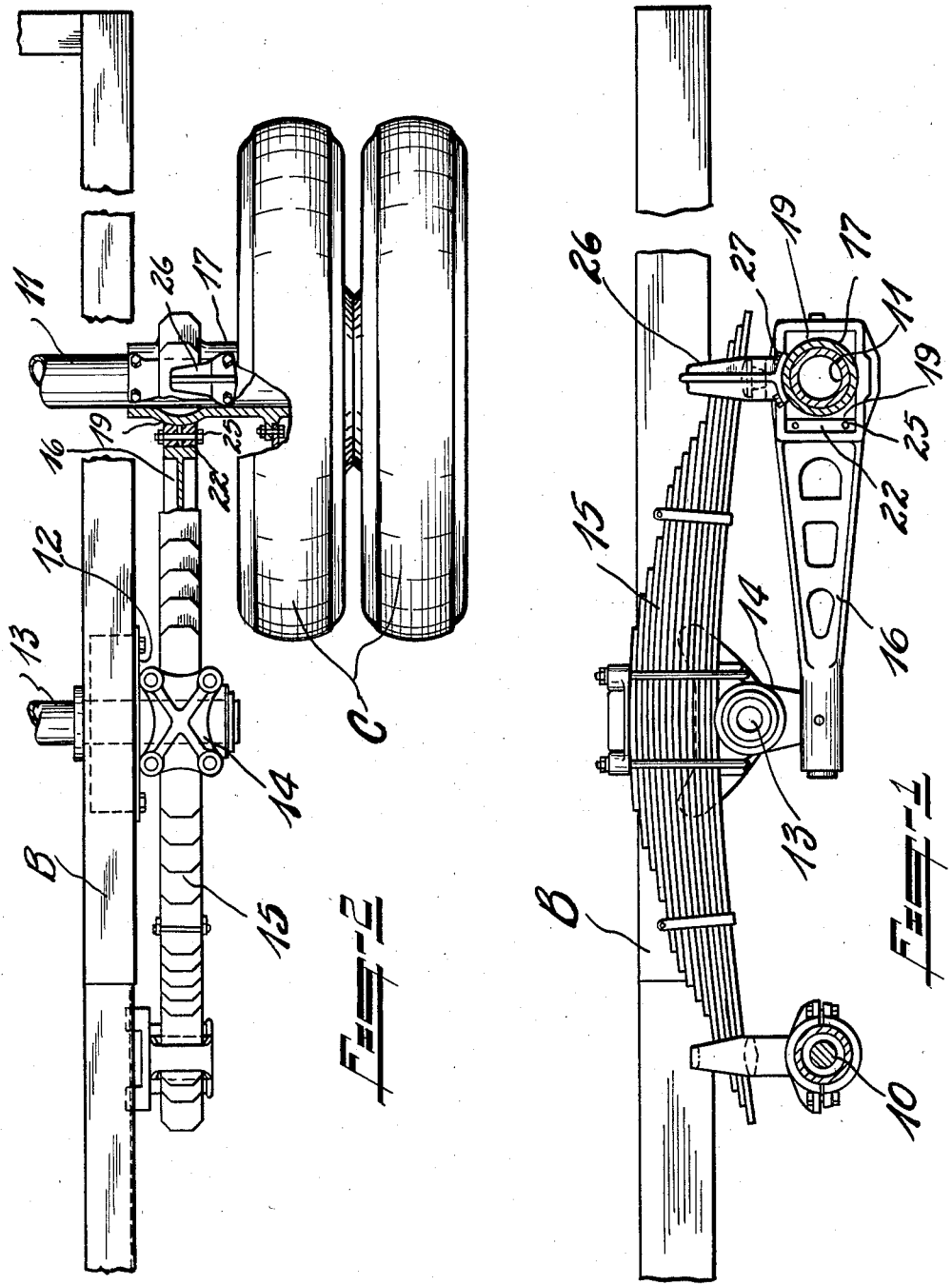
INVENTOR
Edward T. Price.
BY
Frank C. Starman.
ATTORNEY

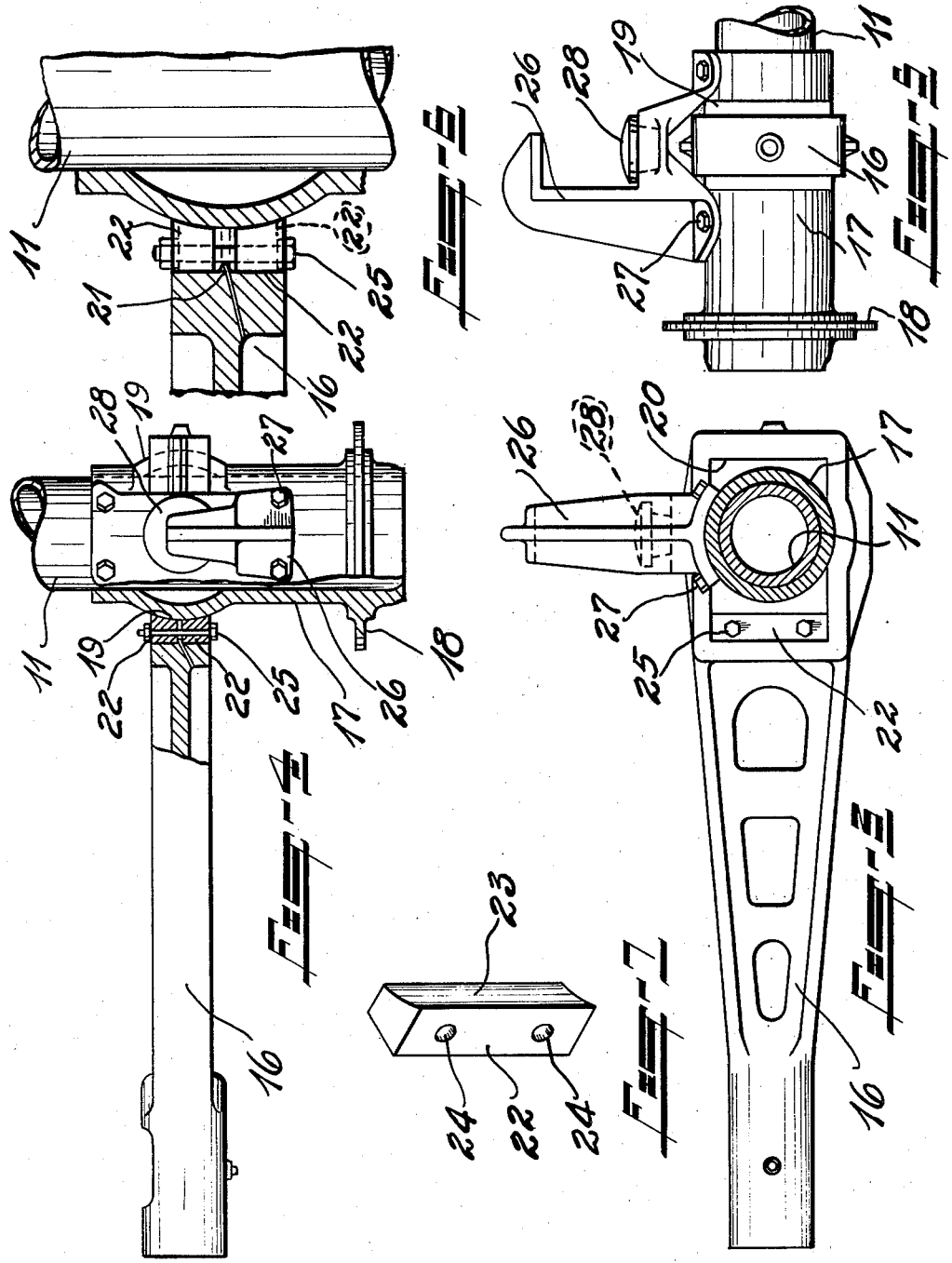

Patented Aug. 6, 1940

2,210,499

UNITED STATES PATENT OFFICE 2,210,499

VEHICLE AXLE SLEEVE

Edward T. Price, Cadillac, Mich., assignor to Cadillac Malleable Iron Co., Cadillac, Mich., a corporation of Michigan Original application October 10, 1934, Serial No. 747,676. Divided and this application August 19, 1938, Serial No. 225,753

5 Claims. (Cl. 267—66)

This invention relates to multi-wheeled vehicles, and more particularly to separable sleeves for the axle thereof.

One of the prime objects of the invention is the provision of an axle having sleeves designed with cylindrical faces to which the vehicle radius rods are connected, so that each wheel may yield to road irregularities without substantially transmitting shocks and strains to the frame of the vehicle.

Another object is to provide an auxiliary axle attached in tandem with a driving axle, and provide sleeves on said axle which are so constructed and connected to the driving axle that it is free to follow any motion of the vehicle without imposing tortional twists or strains on the vehicle frame and chassis, and without tire slippage.

A further object is to design an auxiliary axle including sleeves having swivel connection with a driving axle so that there is no transfer of load from one axle to another as the wheels assume different levels, thereby insuring each axle carrying the same proportion of the total load regardless of wheel levels.

A still further object is to design an axle sleeve combination of sturdy construction, which can be readily manufactured and assembled, and which can be easily attached by unskilled labor with a minimum of time and labor.

With the above and other objects in view, the present invention consists in matters hereinafter set forth, and more particularly pointed out in the appended claims, reference being had to the accompanying drawings in which:

Fig. 1 is a fragmentary side elevational view of a multi-wheeled vehicle including the radius rod, axle sleeve, and other cooperating parts, the axles and sleeve being shown in section.

Fig. 2 is a top plan view, parts being broken away to show the construction and arrangement.

Fig. 3 is an enlarged part sectional side view showing the radius rod assembled on the axle sleeve.

Fig. 4 is a part sectional plan view thereof.

Fig. 5 is a detail rear view showing the axle, axle sleeve and spring perch.

Fig. 6 is an enlarged fragmentary sectional plan view illustrating the bearing blocks, the broken lines showing them in adjusted position.

Fig. 7 is a perspective view of one of the bearing blocks.

The present invention is particularly applicable to the rear auxiliary axle of a multi-wheeled vehicle, and is a division of my previous application for patent entitled "Wheeled attachments for motor vehicles," filed October 10, 1934, Serial #747,676, now Patent Number 2,137,699, November 22, 1938.

In order that the invention may be clearly understood I have shown the rear portion of a vehicle frame which is indicated at B, and a pair of axles 10 and 11 arranged in longitudinally spaced parallel relation, each axle being provided at the opposite ends thereof with road engaging wheels C as usual, and while in the present instance I have shown a fragmentary view of but one side of the vehicle, it will be understood that both sides are identical and are constructed in exactly the same manner.

Brackets 12 are secured to and depend from vehicle frame A, and a transversely disposed shaft 13 is rigidly mounted therein, spring chairs 14 being journaled on the end sections of the shaft 13, and leaf springs 15 are mounted thereon as usual, radius rods 16 being connected to the spring chairs and to the rear axle, and I do not deem it necessary to describe this entire assembly in detail, the descriptive matter being confined to the means for providing a swivel connection between the ends of the radius rods and the rear axle, and to which this application is directed.

The axle sleeve 17 is formed as clearly shown in Figs. 3, 4 and 5 of the drawings, and is mounted on the ends of the axle 11, the outer end being flanged as at 18 to facilitate attachment of a brake plate, (not shown) one of said sleeves being revolvably mounted on the axle, the opposite sleeve being secured to the axle by means of a set screw and lock nut (not shown). This permits the radius rod and sleeves to rotate with relation to the axle as is necessary when one wheel drops into a depression in the roadway while the companion wheel remains level or rides over a raised surface or obstruction.

Cylindrical faces or sections 19 are formed on the front and rear walls of the axle sleeve 17, and the rear end of the radius rod 16 is formed with an opening 20 to accommodate said sleeve and axle, the rear wall of the opening 20 being shaped to conform to the curvature of the section 19 and forms a part of the swivel joint as will be hereinafter more fully described.

A vertically disposed rib 21 is provided on the front wall which defines the opening 20, and tapered bearing blocks 22 are arranged on either side of said rib, said blocks being provided with a curved face 23 which face also conforms to the curvature of the section 19. Transversely disposed openings 24 are provided in the blocks 22, and bolts 25 serve to secure them in assembled relation.

This arrangement provides a swivel connection between the radius rod and the rear axle, so that the wheels on said axle may follow any irregularities in the surface of the roadway without bending, twisting or imposing tortional strains on the vehicle frame.

This construction also eliminates the pins used in conventional swivel joints, and it can be adjusted to compensate for wear, etc., by tightening the bolts 25 to draw the blocks towards each other, and as indicated in broken lines shown in Fig. 6 of the drawings, or shims (not shown) may be inserted between the blocks and the wall of the opening if desired.

A spring perch 26 is mounted on the sleeve 17 by means of bolts 27 and accommodates a wear pad 28 on which one end of the spring 15 rests in the conventional manner.

This design provides a very substantial, desirable and economical swivel joint construction which has large bearing areas and which can be readily adjusted to take up wear.

The invention may be embodied in other specific forms, and the present embodiment is therefore to be considered illustrative rather than restrictive, the scope of the invention being indicated by the appended claims, and all changes that come within the meaning and range of equivalency are intended to be embraced therein.

What I claim is:

1. The combination in a motor vehicle, of an axle having an axle sleeve mounted thereon, individual, curved surfaces on said sleeve, said curved surfaces being disposed at right angles to the longitudinal center line of said sleeve, and a radius rod embracing said sleeve and provided with curved surfaces in facial contact with said cylindrical surfaces to form a swivel joint thereon.

2. The combination in a multi-wheeled motor vehicle of an axle having axle sleeves mounted on the opposite end thereof, cylindrical shaped oppositely disposed sections formed integral with each sleeve, said cylindrical surfaces being disposed at right angles to the longitudinal center line of the sleeve, and a radius rod formed with an opening embracing each sleeve and forming a swivel connection with the cylindrical sections.

3. The combination in a motor vehicle having rear axles arranged in tandem, of axle sleeves on the rear axle, and having cylindrical shaped sections cast integral therewith, and a radius rod embracing each sleeve and provided with socket connections to provide a swivel connection with said sleeve, and means for adjusting said socket connections.

4. The combination in a motor vehicle of a rear axle having axle sleeves mounted thereon adjacent the ends of the axle, cylindrical shaped sections formed integral with each sleeve, a radius rod embracing each sleeve and provided with adjustable socket connections disposed in facial contact with said cylindrical sleeve sections to form a swivel joint, and means for adjusting said connections.

5. The combination in a motor vehicle, of a rear axle provided with axle sleeves on the opposite ends thereof, opposed cylindrical face sections formed integral with said sleeve, a radius rod formed with an opening embracing each sleeve, one wall of said opening being shaped to fit and swivel on one of said face sections, spaced bearing blocks interposed between the opposite wall and the opposite face section, and means for adjusting said bearing blocks.

EDWARD T. PRICE.